United States Patent [19]
Harper

[11] Patent Number: 6,062,689
[45] Date of Patent: May 16, 2000

[54] SUN SCREEN AND METHOD OF USE

[76] Inventor: Deanna Harper, 328 W. Eagle Lake Dr., Maple Grove, Minn. 55369

[21] Appl. No.: 09/280,782

[22] Filed: Mar. 29, 1999

[51] Int. Cl.⁷ ............................ G02C 9/00
[52] U.S. Cl. ................................ 351/47
[58] Field of Search ............ 351/41, 57, 44, 351/45, 46, 47, 155, 140, 141; 359/802, 817, 818; 2/15, 10, 13

[56] References Cited

U.S. PATENT DOCUMENTS

| | | | |
|---|---|---|---|
| 354,976 | 12/1886 | Field | 359/802 |
| 1,768,597 | 7/1930 | Gwathmey | 351/57 |
| 5,502,516 | 3/1996 | Elterman | 351/47 |
| 5,544,361 | 8/1996 | Fine et al. | 351/57 |
| 5,847,883 | 12/1998 | Rispoli, Sr. | 359/802 |

*Primary Examiner*—George Manuel
*Attorney, Agent, or Firm*—Angenehm Law Firm, Ltd; N. Paul Friederichs

[57] ABSTRACT

A mechanism for protecting the eyes from the sun that allows a user's temples and face to be exposed completely to the sun by providing a mechanism that includes a sun-shield, having a sun-protection factor, an arm attached to a stationary object for selectively positioning and maintaining the sun-shield in front of the eyes, and a mechanism for varying the sun-protection factor.

19 Claims, 1 Drawing Sheet

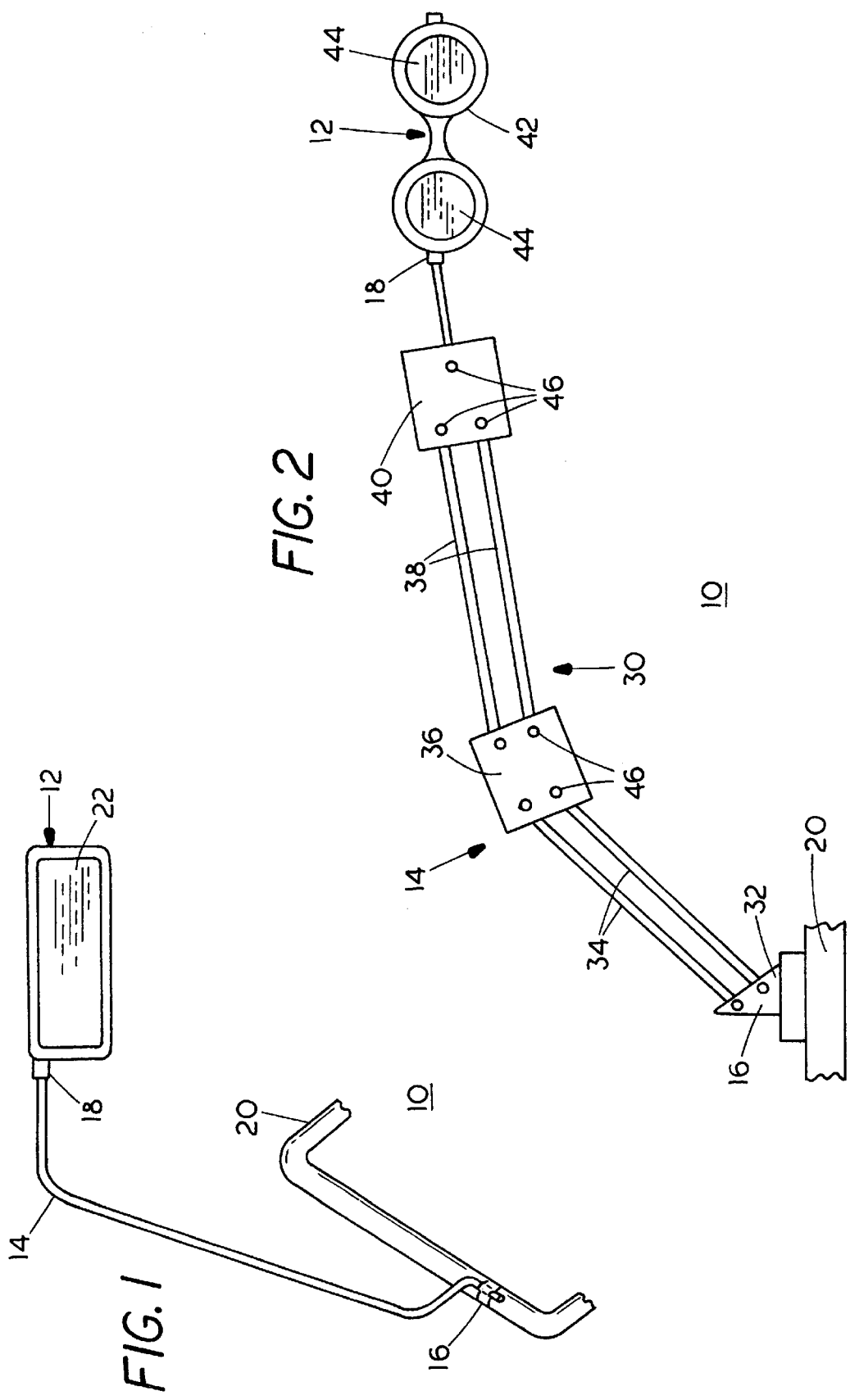

SUN SCREEN AND METHOD OF USE

The present invention relates to protecting the eyes from the sun, and more particularly, to an apparatus and a method for protecting the eyes from the sun that allows a user's temples to be exposed completely to the sun.

BACKGROUND OF THE INVENTION

Sun tans signify status, beauty, sexiness, healthiness therefore, millions of people sunbathe on beaches and decks and in yards, so they can get a sun tan. People even sunbathe at work, during their breaks, trying to improve on their sun tans. Moreover, millions of people take expensive winter vacations to get sun tans.

Tan lines are a by-product of sunbathing. Tan lines are formed at the boundary between the tanned flesh that was exposed to the sun and the untanned flesh that was shielded from the sun by articles of clothing, the bows of glasses, or any object that can shield flesh from the sun. Many sunbathers believe that tan lines detract from the beauty of a sun tan.

Sunbathers typically try to expose as much of their flesh to the sun as possible by wearing bathing suits or shorts while sunbathing. This usually confines tan lines to the more private areas of the body, which are concealed by normal clothing. However, the temple tan lines associated with sunglasses bows are difficult to conceal and are unsightly even in the opinion of the least vain. Who wants to have a white line along each of their temples or on the front of the face or cheeks, commonly referred to as racoon eyes?

In view of the public's recent awareness and concern about adverse short-term and long-term effects on the eyes and visual health due to over exposure of the eyes to the sun and in view of mounting research evidence supporting the occurrence these adverse short- and long-term effects, the necessity of using sunglasses to protect the eyes while sunbathing cannot be ignored.

Studies indicate that most of the damage to the eyes is caused by the ultraviolet (or invisible) portion of the sun's radiation. The sun's radiation is characterized by wavelengths, of which ultraviolet radiation is among the relatively short wavelengths. Ultraviolet radiation occurs at wavelengths between 100 and 400 nanometers while visible light occurs at wavelengths between about 490 and 690 nanometers. Ultraviolet radiation is composed of three segments, designated as A, B, and C. Ultraviolet-C radiation (between 100 and 280 nanometers) is filtered out by the earth's ozone and does not pose a threat. There is much evidence, however, that exposure to both ultraviolet-A (between 315 and 400 nanometers) and ultraviolet-B (between 280 and 315 nanometers) can have adverse short-term and long-term effects on the eyes and visual health.

In 1986, the American National Standards Institute (ANSI) developed voluntary standards for manufacturers of non-prescription sunglasses: cosmetic sunglasses must block at least 70 percent of the ultraviolet-B radiation; general purpose sunglasses must block 95 percent of the ultraviolet-B radiation and most ultraviolet-A radiation; and special purpose sunglasses must block 99 percent of the ultraviolet-B radiation and most ultraviolet-A radiation. The American Optometric Association, the American Academy of Ophthalmology, and the National Society to Prevent Blindness recommend that sunglasses block 99 to 100 percent of both ultraviolet-A and-B radiation and block 75 to 90 percent of the visible light.

The above discussion suggests a conflict between the desire to avoid temple or cheeks sun-tan lines associated with sunglasses bows and the need to wear sunglasses to avoid the adverse short-term and long-term effects on the eyes and visual health due to over exposure of the eyes to the sun.

SUMMARY OF THE INVENTION

The present invention involves a method and apparatus for protecting the eyes from the sun by selectively maintaining a sun-shield in front of the eyes so that the temples remain exposed to the sun, while getting an even face tan.

The present invention includes a sun-shield, having a sun-protection factor, and an arm for movably positioning the sun-shield. The present invention provides for varying the sun-protection factor, which includes a glare-protection factor, an ultraviolet-A radiation-protection factor, and an ultraviolet-B radiation-protection factor. The glare protection factor is defined by the percentage of visible light absorbed by the sun-shield and the ultraviolet-A and -B protection factors by the percentage of ultraviolet-A and -B radiation absorbed by the sun-shield, respectively.

The arm is typically mounted on a stationary object and/or in the ground. The arm selectively varies the position of the sun-shield in three dimensions relative to the stationary object and selectively maintains the position of the sun-shield relative to the stationary object. The arm provides for changing the sun-shields, so that the user may select an appropriate sun protection factor.

In a first embodiment of the invention, the sun protection apparatus consists of a sunshield affixed to an end of a flexible holder and the holder attachable to a selected fixed object. The sunshield may be composes of any suitable material such as an opaque material like aluminum foil, cardboard, plastic. The sunshield may also be translucent or transparent while having a sun protection factor.

The flexible arm is constructed from a suitable material allowing it to be selectively flexed responsive to the user's movement and placement at a selected location. The flexible arm is attached to the selected fixed object using any suitable connection, such a clamp that will allow the holder to be detachable attached. The attachment may any suitable clamp, such as a spring clamp or an encircling hose clamp.

In the second embodiment of the invention, the arm is an articulated type, similar to the type typically used for positioning lamps, and the arm is mounted to a stationary object, such as a lawn chair. The arm can move relative to the lawn chair when a human force is applied to arm, via human arm and hand muscles. The arm maintains its position at the point at which the force is removed. The sun-shield is preferably a pair of bowless sunglass lenses contained in a frame. The provision for varying the sun-protection factor is a frame typically used for framing sunglass lenses, that is modified for selectively removable attachment to the arm.

The method of using the preferred second of the invention involves a user sitting on the stationary object, such as a lawn chair, or the like, on which the apparatus is mounted. Next, the user selects a sun-shield having the desired sun-protection factor, the user then positions the arm, relative to the stationary object and thereby positions the sun-shield in between the eyes and the sun.

BRIEF DESCRIPTION OF THE FIGURES

FIG. 1 shows an overall view of the first embodiment of the invention

FIG. 2 shows an overall view of the second embodiment of the invention.

DESCRIPTION OF THE INVENTION

The sun screen 10, as shown in FIG. 1, consists of a sun protector 12, a positioning apparatus 14 and mount 16. The sun protector 12 is attached to the positioning apparatus 14 using a removable attachment device 18.

The mount 16 allows the sun screen 10 to be selectively attached to a stationary object 20 and removed when not in use. The attachment device 16 may be any one of a number of readily available items, such as worm gear band clamp, a spring clothespin like clamp, or any other device that provides for the selective attachment of the sun screen 10 to the stationary object 20.

The positioning apparatus 14 is attached to the mount 16 using any suitable method, such as welding or brazing, adhesives, or fasteners such as screws or bolts. The positioning apparatus 14 is constructed from any suitable material having the properties to allow the repeated bending without out breakage and minimal spring back, sufficient flexibility to allow the user to bend the positioning apparatus 14 without undue exertion, and sufficient strength to support the sun protector 12 in the position selected by the user with minimal environmentally caused movement. The positioning apparatus 14 may be constructed from any material having the necessary properties, such as, a plastic or polymer encased metallic wire, an unencased metallic wire, plastic rod or tube, or a flexible metal tube composed of a spiraled metal strip.

The removable attachment device 18 connects the positioning apparatus 14 to the sun protector 12. The removable attachment device 18 may any suitable device that allows the user to select a sun protector 12 and attach the sun protector 12 to the sun screen 10. Suitable devices for removable attachment include adhesive tape, such as duct tape; spring clips; removable bolts; or any other suitable fasteners.

The sun protector 12 in its simplest form is shown in FIG. 1 as a rectangular shield 22 which is placed between the user's face and the sun. The rectangular shield 22 may be opaque, or preferably has a sun protection factor for allowing the passage of both visible and tanning light. While the rectangular shield 22 solves the problem of preventing the bow lines from sunglasses from appearing on the user's face, it also reduces or prevents tanning on a large area of the face unevenly and burning of the eyes. Certainly the rectangular shield when properly placed prevents the passage of the harmful rays of sunlight in the umbra of its shadow and reduces the amount of harmful rays in the penumbra of its shadow. It does tend to block much of the user's face from sunlight and prevent or at least reduce tanning of the user's face.

The sun protection factor of the rectangular shield 22 is the physical property of the rectangular shield 22 which allows the passage of a portion of the visible, and, preferably, the wavelengths of tanning light to pass while absorbing or reflecting the UV light. The rectangular shield 22 would be typically constructed from an unbreakable polymer having the desired light transmission properties which make up the sun protection factor. It is advantageous, if not required, that the rectangular shield be unbreakable from the standpoint of safety as the sun screen 10 will be used in environments such as a beach where activities such as playing ball may also be occurring and the opportunity for a flying object impacting the rectangular shield 22 does exist.

In a second embodiment of the sun screen 10 the positioning apparatus is in the form of an articulated arm 30 as shown in FIG. 2. The articulated arm 30 is similar to the type of articulated arms used with reading lights or the like. The articulated arm 30 is affixed to the mount 16 and extends outwardly therefrom. The articulated arm 30 terminates in the removable attachment device 18 onto which the sun protector 12 is attached.

The mount 16 includes a attachment device which may be spring, threaded or worm gear clamps to allow the mount 16 to be selectively attached to a stationary object 20. It is preferred that that the mount 16 be rotatable attached to the stationary object 20.

The mount 16 is attached to the first pivot plate 32 from which a first pair of locator rods 34 extend. The first pair of locator rods 34 extend from the first pivot plate 32 to a second pivot plate 36 allowing the movement of the second pivot plate 36 with respect to the first pivot plate 32. A second pair of locator rods 38 extends form the second pivot plate 36 to a third pivot plate 40. The second pair of locator rods 38 allow the movement of the third pivot plate 40 with respect to the second pivot plate 32.

Extending from the third pivot plate 40 is the removable attachment device 18 connecting the sun protector 12. The removable attachment device 18 may be simply a connector, and is preferably elongate with a positional connection to the sun protector 12 to allow the user to position the sun screen more easily.

Each of the pairs of locator rods 34, 38 is connected to the respective pivot plates 32, 36, 40 through a pivotal connector 46. Pivotal connectors 46 allow the respective connector rods 34, 38 to pivot with respect to the pivot plates 32, 36, 40. The pivotal connectors 46 preferably provide sufficient friction or counterbalance such that when the user moves the sun protector 12 to a selected location the friction retains the sun protector 12 in that selected location.

The sun protector 12 may be the rectangular shield 22, as shown and described in FIG. 1 or alternately is a pair of bowless sunglasses 42 as shown in FIG. 2. It being understood that either the rectangular shield 22 or the bowless sunglasses 42 may be used with either the first or the second embodiment of the of the sun screen 10.

The bowless sunglasses 42 may be simply sunglasses with the bows removed and attached to the removable attachment device 18 or the bowless sunglasses may be specially adapted for attachment to the removable attachment device 18. The bowless sunglasses 42 may be of any size or shape suitable for the intended purpose of screening the sun and may be quite large or small such as for partially or fully covering the face. The bowless sunglasses 42 have a pair of lenses 44 located in a spaced apart relationship as is conventional for sunglasses for placement between the user's eyes and the ambient sunlight. The lenses 44 may be constructed of any suitable transparent material such as glass or a polymer. The lens 44 have at least one of the following properties; absorbance or reflectance of visible light, absorbance or reflectance of ultraviolet light, or glare reduction together which make up the sun protection factor. Lens 44 having these properties are well known in the art and available from many commercial sources such as Bausch & Lomb® or Pentax®.

The sun protection factor of the lens 44 is selected to provide the preferred amount or eye protection by absorbing or reflecting the majority and preferably all of the UV light thereby protecting the users eyes from this type of harmful radiation while passing part of the visible light and, preferably all of the tanning light. Additionally, the lens 44 can be fabricated in varying colors and having varying coatings for either style or functionality. An example of style would be blue colored lens the user can coordinate his sunscreen 10 with the rest of the outfit of the day. Another example would be mirrored lens 44 to maintain the user's anonymity, however, mirroring of the lens 44 is also functional.

Examples of varying color of the lens 44 for functional reasons would include neutral gray lens 44 so that the lens 44 do not alter the color of objects as seen by the user. Also, red lens 44 to increase the contrast that the user sees; or mirrored lens 44 to reduce the glare perceived by the user.

In its use, the user selects a sun protector 12 having the desired sun protection factor. The selection of the sun protection factor will be based on several criteria including the time of day, the amount of available sunlight, the user's particular skin pigmentation, and the amount of time the user anticipates being out in the sun. The selected sun protector 12 is attached to the positioning apparatus 16 which completes the assembly of the sun screen 10.

The sun screen 10 is taken outside to a location selected by the user for sun tanning. In the selected location, the user positions his stationary object 20, such as a lawn chair or a table and attaches the sun screen 10 to the stationary object 20 (or the ground) using the removable attaching device 20.

The user moves the sun protector 12 to the desired location with respect the stationary object 20 so as to shield his face from the direct sunlight and places himself in the stationary object 20 for sun bathing. As either the sun or the user moves, the user may reposition the sun protector to maintain the shielding of his face. When the sun protector 12 is the rectangular shield 22, the rectangular shield 22 is typically placed farther from the user's face than when the sun protector 12 is the bowless sunglasses 42.

When the rectangular shield 22 is use as the sun protector 12, the user may place the rectangular shield 22 so as to block the sun while allowing the user to place a book or other printed material in a convenient location so as the user need not look through the sun protector 12 to read.

Should the user determine that the sun protection factor of the sun protector 12 is incorrect for the current conditions, the user may replace the sun protector 12 with a more suitable sun protector 12 without removing the sun screen 10 from the stationary object.

Although the present invention has been described with reference to preferred embodiments, workers skilled in the art will recognize changes may be made in form and detail without departing from the spirit and scope of the invention.

It is hereby claimed:

1. An apparatus for selectively protecting the eyes from the sun comprising:

means for protecting the eyes from sun, the protecting means having a sun protection factor, the protecting means allowing light to pass therethrough sufficiently without distortion to allow a sunbather to obtain an even tan without burning of the eyes;

means for positioning the protection means, the positioning means mounted on a sunbather supporting object for movement relative to the object, the positioning means selectively varying the position of the protecting means in three dimensions relative to the object, the positioning means positioning the protecting means between a sun and a sun bather's eyes, and the positioning means maintaining the position of the eye-protection means relative to the object; and means for varying the sun-protection factor, the varying means having a set of selectively removable eye-protection means each having a different sun-protection factor, wherein the sun-protection factor comprises a glare protection factor and ultraviolet-A and -B radiation protection factors.

2. An apparatus comprising means for protecting eyes from the sun, the protecting means having a sun protection factor, the protecting means allowing light to pass therethrough sufficiently without distortion to allow a sunbather to obtain an even tan without burning of the eyes; and means for positioning the protecting means between a sun and a sun bather's eyes, the positioning means selectively varying the position of the protecting means in three dimensions relative to a sun bather's eyes.

3. The apparatus of claim 2 wherein said positioning means is mounted to a stationary object.

4. The apparatus of claim 3 wherein the stationary object is a lawn.

5. The apparatus of claim 4 wherein the positioning means is movable relative to the lawn.

6. The apparatus of claim 3 wherein the positioning means is selectively mounted on the stationary object.

7. The apparatus of claim 6 wherein a clamp mounts the positioning means to the stationary object.

8. The apparatus of claim 7 wherein the positioning means is movable relative to said clamp.

9. The apparatus of claim 3 wherein the positioning means selectively varies the position of the protecting means in three dimensions relative to the stationary object.

10. The apparatus of claim 9 wherein the positioning means selectively maintains the position of the protecting means relative to the object.

11. The apparatus of claim 2 further comprising a set of selectively removable protection means each having a different sun-protection factor.

12. The apparatus of claim 2 wherein the apparatus is sunglasses.

13. The apparatus of claim 2 wherein the sun-protection factor comprises a glare protection factor.

14. The apparatus of claim 2 wherein the sun-protection factor comprises ultraviolet-A radiation protection factor.

15. The apparatus of claim 2 wherein the sun-protection factor comprises ultraviolet-B radiation protection factor.

16. A method of protecting the eyes from the sun, comprising the step of:

protecting eyes from the sun with at least one lens having sun protection factor;

allowing light to pass through the lens sufficiently without distortion to allow a sunbather to obtain an even tan without burning of the eyes;

positioning the lens between a sun and a sun bather's eyes selectively varying the position of the lens in three dimensions relative to a sun bather's eyes; and varying the sun-protection factor.

17. The method of claim 16, wherein the step of positioning further comprises the steps of:

a. sitting on an object and b. positioning the lens using a positioning means mounted on the object.

18. The method of claim 16, wherein the step of positioning further comprises the steps of:

a. selectively mounting a positioning means on a object and b. positioning the lens using a positioning means.

19. The method of claim 16, wherein the step of varying the sun-protection factor is carried out by the steps of:

a. removing the lens and b. replacing the lens with lens having a different sun-protection factor.

* * * * *